Figure 1:
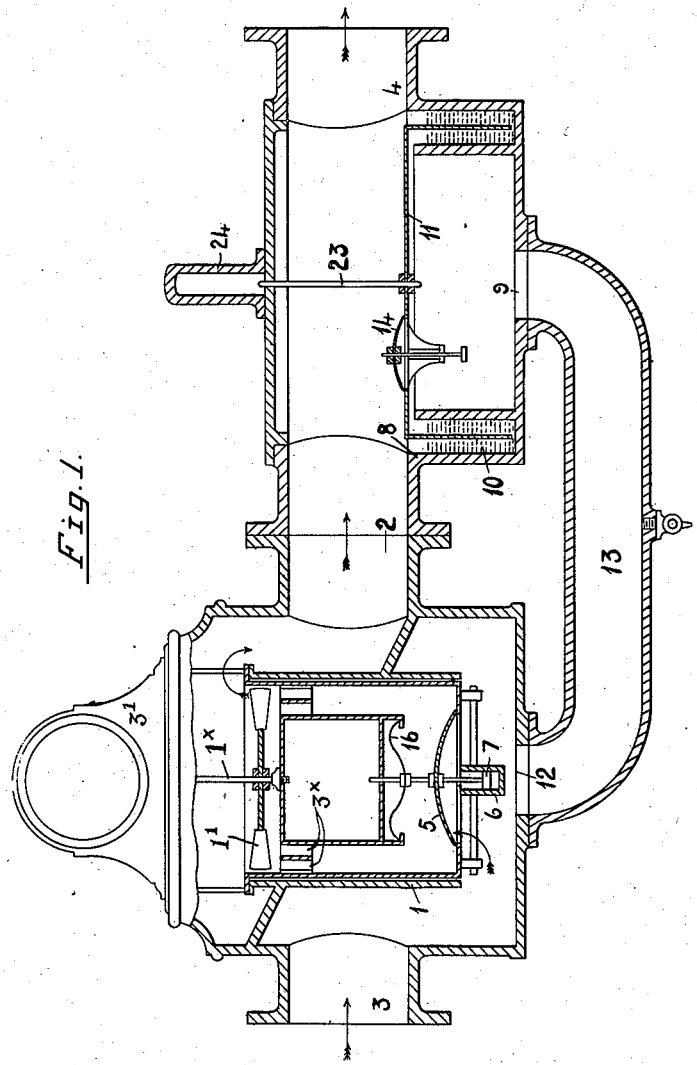

No. 867,855. PATENTED OCT. 8, 1907.
T. THORP.
APPARATUS FOR OBTAINING A UNIFORM RATE OF FLOW OF GASES
IN PIPE CONDUITS.
APPLICATION FILED JULY 11, 1906.

WITNESSES
W. P. Burke
J. H. Saunders

INVENTOR
Thomas Thorp
BY Richards
ATT'S

No. 867,855.

T. THORP.

PATENTED OCT. 8, 1907.

APPARATUS FOR OBTAINING A UNIFORM RATE OF FLOW OF GASES IN PIPE CONDUITS.

APPLICATION FILED JULY 11, 1906.

2 SHEETS—SHEET 2.

WITNESSES

INVENTOR
Thomas Thorp

UNITED STATES PATENT OFFICE.

THOMAS THORP, OF WHITEFIELD, NEAR MANCHESTER, ENGLAND.

APPARATUS FOR OBTAINING A UNIFORM RATE OF FLOW OF GASES IN PIPE-CONDUITS.

No. 867,855.

Specification of Letters Patent.

Patented Oct. 8, 1907.

Application filed July 11, 1906. Serial No. 325,719.

*To all whom it may concern:*

Be it known that I, THOMAS THORP, a subject of the King of Great Britain and Ireland, and a resident of Whitefield, in the county of Lancaster and Kingdom of Great Britain, have invented certain new and useful Improvements in Apparatus for Obtaining a Uniform Rate of Flow of Gases in Pipe-Conduits, of which the following is a specification.

This invention relates to apparatus for obtaining a uniform rate of flow of fluids in sections of pipes or closed conduits in cases where the pressure is subject to sudden variations as for instance where gas engines are supplied or exhausters used or where the production of a gas is intermittent and particularly to such apparatus used in conjunction with fluid meters, the chief object of this invention being to obtain a steady flow notwithstanding the fluctuations of pressure.

The drawing attached hereunto shows arrangements of my improved apparatus in which a fluid meter of the rotary or inferential type similar to that for which Letters Patent #732385 have been granted to me, forms part of the pipe conduit.

Figure 2:
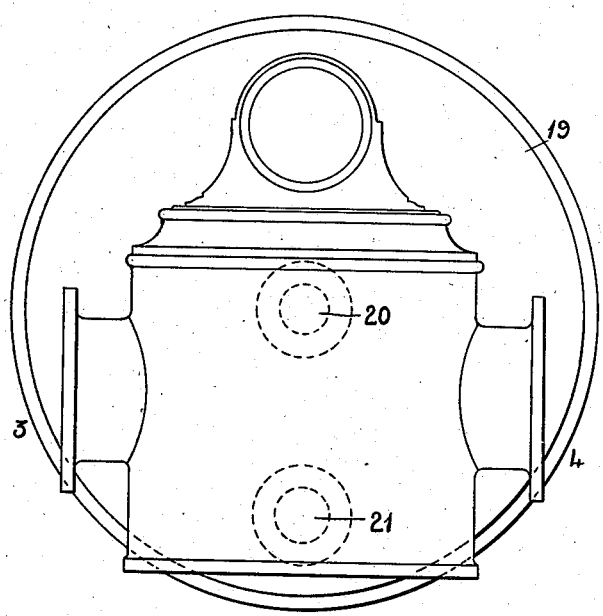
Figure 3:
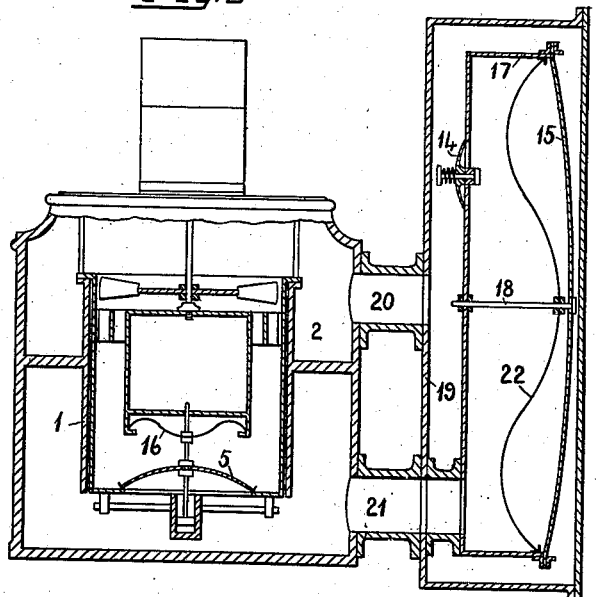

Figure 1 is a sectional elevation through the meter and said apparatus, and the several portions of the whole being cylindrical no other view, is needed or shown; Figs. 2 and 3 are two views of a modified form of construction.

According to this invention the uniform rate of flow is obtained, first by interposing a valve in the current and which opens to the flow and is controlled so as to prevent sudden movement thereof and beyond this valve a device which acts as a kind of equilibrium reservoir for the excess volume endeavoring to pass through the valve.

In the drawing, the meter represented by 1 is shown interposed in the conduit 2 so that all the current shall normally pass through it, 3 representing the inlet and 4 the outlet.

1' is the vane wheel of the meter connected to the spindle 1$^X$ which actuates the indicating mechanism contained in the case 3'.

3$^X$ are the passages for directing the gas onto the vanes.

The valve 5 normally closes the entrance to the meter and if no meter were interposed, it would normally stop up the passage through the conduit. The valve opens to the flow and is so weighted that when upon its seat it requires a certain pressure to open it. It is shown weighted by a spring 16 made and applied as described in the specification filed with my application for Letters Patent No. 291500, filed December 12th. by which as the valve rises, the pressure thereon of the spring decreases so that the amount of pressure absorbed by the valve and passage through the conduit remains constant for various rates of flow.

The valve is provided with a dashpot arrangement for the purpose of preventing a too sudden opening or closing of the same. This arrangement consists of a cup 6 fixed to the casing centrally beneath the valve, and a plunger 7 fixed to the valve spindle, a small duct not shown, being provided for permitting the fluid beneath the plunger to pass to the top thereof in the usual way. Referring now exclusively to Fig. 1, the conduit 2 is enlarged to form a cylindrical chamber 8 which has an opening 9 in the bottom and a deep channel 10 round its inside periphery. The channel is nearly filled with mercury or some other suitable liquid and a bell or abutment 11 dips into the same, the bell being weighted to produce the same pressure per square inch as the meter absorbs. An opening 12 is formed in the meter casing beneath the valve 5 and a branch pipe 13 leads from this opening to the aforesaid opening 9. A relief or safety valve 14 is preferably placed in the bell 11 which has its lift restricted, by the rod 23 and cap 24, and the valve opens into the conduit 2 and is loaded so that it will open before the mercury seal becomes broken by any abnormal pressure.

In the modification shown in Figs. 2 and 3, Fig. 2 being a front elevation and Fig. 3 a sectional side elevation, the flexible diaphragm 15 of oil sheeting, indiarubber and canvas, or of leather is substituted for the bell 11, and is shown fixed round its periphery to a chamber formed by the casing 17 in which the relief valve 14 is placed. The diaphragm 15 is guided by a rod 18 which can slide in the back of the chamber or by other suitable known means. Over the diaphragm 15 and the casing 17 is an outer casing 19 having upper and lower orifices 20 and 21 respectively corresponding with similar orifices in the meter casing, the lower orifice leading from the under side of the valve 5 and the upper orifice leading into the outlet passage from the measuring chamber of the meter or the conduit 2. The diaphragm is loaded with a spring 22 similar to that hereinbefore referred to in relation to the valve, so that a uniform difference of the internal and external pressures is maintained for all positions of the diaphragm. This antipulsator may be made with two diaphragms one at each side in place of one and the inlet thereto is placed in the cylindrical casing between the diaphragm.

When the pressure in the inlet 3 suddenly increases, the valve 5 in consequence of its connection to the dashpot cannot rise immediately, to allow the whole quantity of gas to pass through, but the excess will flow into the extensible chamber and lift the bell or press the diaphragm outwards and if the pressure decreases again, the gas contained in the chamber will be forced back into the inlet 3 and pass through the valve. If the increased pressure continues, the valve 5 will gradually rise to allow a larger volume to pass, till the difference of pressures before the valve and in the outlet of the conduit has assumed the normal state, when the extensible chamber will likewise contract again.

I claim as my invention:

1. In a pipe conduit for gases the combination of a free lifting valve adapted to close the inlet to said conduit, a dashpot and a spring connected to said valve, said spring being adapted to maintain a uniform difference of the pressures in said conduit before the inlet and at the outlet, an extensible and contractible chamber the outside of which is exposed to the pressure in the outlet from the conduit and the inside of which is exposed to the pressure in the inlet to the conduit, said chamber being in equilibrium for the same difference of external and internal pressures as that maintained by the valves.

2. In a pipe conduit for gases the combination of a free lifting valve adapted to close said conduit, a dashpot connected to said valve, a spring connected to said valve and adapted to maintain a uniform difference of the pressures before the valve and at the outlet of the conduit, a casing in open communication with the conduit behind the valve, an extensible and contractible chamber inside said casing and in open communication with the conduit before the valve, a flexible diaphragm forming a side of said chamber and a spring connected to the diaphragm and adapted to maintain the same difference of the inside and outside pressures as that maintained by the valve.

3. In a pipe conduit for gases, a loaded valve adapted to open and close the conduit, means for preventing abrupt movements of said valve, a by-pass around said valve and a loaded movable abutment in said by-pass movable under variations of pressure in the conduit, as and for the purpose set forth.

In testimony whereof I have hereunto set my hand in the presence of two witnesses.

THOMAS THORP.

Witnesses:
FRANKLIN THORP,
NORMAN DUNCAN.